(12) United States Patent
Baik

(10) Patent No.: US 12,196,919 B2
(45) Date of Patent: Jan. 14, 2025

(54) OPTICAL IMAGING SYSTEM

(71) Applicant: SAMSUNG ELECTRO-MECHANICS CO., LTD., Suwon-si (KR)

(72) Inventor: Jae Hyun Baik, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 111 days.

(21) Appl. No.: 17/197,150

(22) Filed: Mar. 10, 2021

(65) Prior Publication Data

US 2021/0199927 A1 Jul. 1, 2021

Related U.S. Application Data

(63) Continuation of application No. 15/085,090, filed on Mar. 30, 2016, now Pat. No. 10,976,521.

(30) Foreign Application Priority Data

Nov. 26, 2015 (KR) ......................... 10-2015-0166744

(51) Int. Cl.
*G02B 13/00* (2006.01)
*G02B 5/00* (2006.01)
*G02B 5/20* (2006.01)
*G02B 9/62* (2006.01)

(52) U.S. Cl.
CPC ......... *G02B 13/0045* (2013.01); *G02B 5/005* (2013.01); *G02B 5/208* (2013.01); *G02B 9/62* (2013.01)

(58) Field of Classification Search
CPC ........ G02B 5/005; G02B 5/208; G02B 13/18; G02B 13/0045; G02B 15/146; G02B 9/62; G02B 9/64; H04N 5/2254; H04N 5/222
USPC ......... 359/656–658, 708, 713, 719, 756–762
See application file for complete search history.

(56) References Cited

U.S. PATENT DOCUMENTS

| | | | |
|---|---|---|---|
| 6,404,564 | B1 | 6/2002 | Yamada |
| 8,472,128 | B2 | 6/2013 | Huang |
| 8,743,483 | B2 | 6/2014 | Hsu et al. |
| 8,854,744 | B2 | 10/2014 | Liao et al. |

(Continued)

FOREIGN PATENT DOCUMENTS

| | | |
|---|---|---|
| CN | 101473439 A | 7/2009 |
| CN | 103513404 A | 1/2014 |

(Continued)

OTHER PUBLICATIONS

Machine translation of CN104423017 (Year: 2023).*

(Continued)

*Primary Examiner* — Travis S Fissel
(74) *Attorney, Agent, or Firm* — NSIP Law

(57) ABSTRACT

An optical imaging system includes a first lens having a positive refractive power, a second lens having a positive refractive power, a third lens having a positive refractive power, a fourth lens having a negative refractive power, a fifth lens having a positive refractive power, wherein an object-side surface of the fifth lens is concave; and a sixth lens having a negative refractive power, wherein the sixth lens has an inflection point formed on an image-side surface thereof, wherein the first to sixth lenses are sequentially disposed from an object side toward an imaging plane.

15 Claims, 20 Drawing Sheets

(56) References Cited

U.S. PATENT DOCUMENTS

| | | | |
|---|---|---|---|
| 9,046,672 | B2 | 6/2015 | You |
| 9,057,865 | B1 | 6/2015 | Hsu et al. |
| 9,557,530 | B2 | 1/2017 | Chen |
| 2010/0165134 | A1 | 7/2010 | Dowski, Jr. et al. |
| 2012/0229917 | A1 | 9/2012 | Huang |
| 2013/0003193 | A1 | 1/2013 | Huang |
| 2013/0070346 | A1 | 3/2013 | Hsu et al. |
| 2013/0279021 | A1* | 10/2013 | Chen .................. G02B 5/005 359/713 |
| 2013/0335833 | A1 | 12/2013 | Liao et al. |
| 2014/0043695 | A1 | 2/2014 | Hsu et al. |
| 2014/0078603 | A1* | 3/2014 | You .................. G02B 13/0015 359/759 |
| 2014/0092491 | A1 | 4/2014 | Hsu et al. |
| 2014/0111872 | A1 | 4/2014 | Tang et al. |
| 2014/0211327 | A1 | 7/2014 | Chen et al. |
| 2014/0376107 | A1 | 12/2014 | Son |
| 2015/0049166 | A1 | 2/2015 | Sugiyama et al. |
| 2015/0177489 | A1 | 6/2015 | Hashimoto |
| 2015/0248016 | A1 | 9/2015 | Sakai |
| 2015/0253546 | A1 | 9/2015 | Sun |
| 2015/0277085 | A1 | 10/2015 | Noda |
| 2015/0316749 | A1 | 11/2015 | Chen |
| 2016/0018629 | A1* | 1/2016 | Tang .................. G02B 13/0045 359/713 |
| 2016/0070094 | A1 | 3/2016 | Togino |
| 2016/0131873 | A1* | 5/2016 | Tang .................. G02B 13/0045 359/713 |
| 2016/0195691 | A1 | 7/2016 | Bito et al. |
| 2016/0223797 | A1 | 8/2016 | Zhao |

FOREIGN PATENT DOCUMENTS

| | | | | |
|---|---|---|---|---|
| CN | 104133283 | A | | 11/2014 |
| CN | 104423017 | A * | | 3/2015 ......... G02B 13/0045 |
| CN | 204595309 | U | | 8/2015 |
| CN | 103576297 | B | | 9/2015 |
| JP | 2013-25202 | A | | 2/2013 |
| JP | 2013-37202 | A | | 2/2013 |
| JP | 2013-174740 | A | | 9/2013 |
| JP | 2015-40869 | A | | 3/2015 |
| JP | 2015-72405 | A | | 4/2015 |
| JP | 2015-121730 | A | | 7/2015 |
| KR | 10-2014-0035829 | A | | 3/2014 |
| KR | 10-2016-0095935 | A | | 8/2016 |
| TW | 201234038 | A1 | | 8/2012 |
| TW | 201237454 | A1 | | 9/2012 |
| TW | I431312 | B | | 3/2014 |
| TW | I438475 | B | | 5/2014 |
| TW | I438521 | B | | 5/2014 |
| TW | I439720 | B | | 6/2014 |
| TW | I493218 | B | | 7/2015 |
| WO | WO 2014/080561 | A1 | | 5/2014 |
| WO | WO 2015/040867 | A1 | | 3/2015 |

OTHER PUBLICATIONS

Translation and Original CN105068220 (Year: 2024).*
Taiwanese Office Action issued on Jul. 13, 2022, in counterpart Taiwanese Patent Application No. 111108292 (4 pages in English and 5 pages in Chinese).
Taiwanese Office Action issued on Jul. 19, 2017 in corresponding Taiwanese Patent Application No. 105110430 (7 pages in English and 6 pages in Taiwanese).
Korean Office Action issued on May 15, 2017 in corresponding Korean Patent Application No. 10-2015-0166744 (6 pages in English and 4 pages in Korean).
Korean Office Action issued on Nov. 9, 2020 in the related Korean Patent Application No. 10-2017-0165128 (6 pages in English and 4 pages in Korean).
Chinese Office Action issued on Aug. 23, 2018 in corresponding Chinese Patent Application No. 201610258587.5 (7 pages in English, 6 pages in Chinese).
Chinese Office Action dated Jan. 22, 2021 issued in counterpart Chinese Patent Application No. 201910565693.1. (4 pages in English)(6 pages in Chinese).
Plot of Aspheric Data 2013.
Taiwanese Office Action issued on Jan. 20, 2022, in counterpart Taiwanese Patent Application No. 110120929 (5 pages in English and 6 pages in Mandarin).
Korean Notice of Reason for Rejection issued on Oct. 15, 2021 in counterpart Korean Patent Application No. 10-2021-0110059 (5 pages in English, 4 pages in Korean).
Korean Office Action issued on Jun. 9, 2023, in counterpart Korean Patent Application No. 10-2023-0052104 (8 pages in English, 5 pages in Korean).
Taiwanese Office Action issued on Jan. 2, 2024, in counterpart Taiwanese Patent Application No. 112116313 (5 pages in English, 6 pages in Chinese).

* cited by examiner

| FIRST EMBODIMENT |||||||
|---|---|---|---|---|---|---|
| TTL = | 4.150 | | | f = | 2.4700 | |
| SURFACE NO. | | RADIUS OF CURVATURE | THICKNESS/ DISTANCE | REFRACTIVE INDEX | ABBE NUMBER | FOCAL LENGTH |
| S1 | FIRST LENS | infinity | 0.2972 | 1.614 | 25.6 | 103.412 |
| S2 | | −64.105 | 0.0500 | | | |
| S3 | SECOND LENS | 1.3776 | 0.4140 | 1.544 | 56.1 | 6.530 |
| S4 | | 2.0054 | 0.1044 | | | |
| S5 | THIRD LENS | 6.9926 | 0.3252 | 1.544 | 56.1 | 7.151 |
| S6 | | −8.7133 | 0.2454 | | | |
| S7 | FOURTH LENS | 8.5722 | 0.2300 | 1.651 | 21.5 | −7.292 |
| S8 | | 3.0436 | 0.1452 | | | |
| S9 | FIFTH LENS | −2.2248 | 0.7547 | 1.544 | 56.1 | 1.458 |
| S10 | | −0.6572 | 0.0500 | | | |
| S11 | SIXTH LENS | 1.6797 | 0.4134 | 1.534 | 55.7 | −2.064 |
| S12 | | 0.6101 | 0.3605 | | | |
| S13 | FILTER | infinity | 0.1100 | | | |
| S14 | | infinity | 0.6481 | | | |
| S15 | IMAGING PLANE | infinity | 0.0019 | | | |

FIG. 4

| FIRST EMBODIMENT | S1 | S2 | S3 | S4 | S5 | S6 | S7 | S8 | S9 | S10 | S11 | S12 |
|---|---|---|---|---|---|---|---|---|---|---|---|---|
| K | 0 | 0 | 0 | 0 | 99.00000 | -21.00679 | -0.90877 | 0.00000 | 4.15609 | -0.81451 | -0.15204 | -4.430584 |
| A | 0.18868 | 0.29706 | -0.06637 | -0.47991 | -0.32560 | -0.33169 | -0.81380 | -0.31788 | 0.40987 | 0.70382 | -0.39794 | -0.156073 |
| B | -0.05717 | -0.05296 | 0.03948 | 0.16010 | -0.12217 | 0.59464 | 0.13544 | -0.70670 | -0.80498 | -1.75382 | 0.19751 | 0.080009 |
| C | 0.03139 | -0.02125 | -0.28353 | -0.21479 | 1.96959 | -2.68068 | -3.43463 | 2.13557 | 0.55038 | 3.38477 | -0.06470 | -0.030979 |
| D | 0.00112 | 0.15024 | 0.09843 | 0.78381 | -7.50381 | 9.98277 | 17.29376 | -3.04262 | 0.33570 | -4.23987 | 0.00902 | 0.006376 |
| E | 0.00052 | 0 | 0 | 0 | 18.67377 | -19.43382 | -39.93271 | 2.12128 | -0.41337 | 2.98995 | 0.00112 | -0.000624 |
| F | 0 | 0 | 0 | 0 | -18.25348 | 13.59501 | 33.04843 | -0.42448 | 0.12752 | -0.84082 | -0.00043 | 0.000023 |
| G | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 |

FIG. 5

| SECOND EMBODIMENT ||||||
|---|---|---|---|---|---|
| TTL = 4.150 |||| f = | 2.2650 |
| SURFACE NO. | | RADIUS OF CURVATURE | THICKNESS/ DISTANCE | REFRACTIVE INDEX | ABBE NUMBER | FOCAL LENGTH |
| S1 | FIRST LENS | infinity | 0.3788 | 1.614 | 25.6 | 35.175 |
| S2 | | −21.805 | 0.0578 | | | |
| S3 | SECOND LENS | 1.4421 | 0.3644 | 1.544 | 56.1 | 7.863 |
| S4 | | 1.9767 | 0.1164 | | | |
| S5 | THIRD LENS | 6.3251 | 0.3218 | 1.544 | 56.1 | 6.937 |
| S6 | | −9.2925 | 0.1945 | | | |
| S7 | FOURTH LENS | 22.6415 | 0.2408 | 1.651 | 21.5 | −6.434 |
| S8 | | 3.5515 | 0.0957 | | | |
| S9 | FIFTH LENS | −2.2937 | 0.7984 | 1.544 | 56.1 | 1.425 |
| S10 | | −0.6529 | 0.0500 | | | |
| S11 | SIXTH LENS | 1.6267 | 0.4337 | 1.534 | 55.7 | −2.276 |
| S12 | | 0.6326 | 0.3378 | | | |
| S13 | FILTER | infinity | 0.1100 | | | |
| S14 | | infinity | 0.6400 | | | |
| S15 | IMAGING PLANE | infinity | 0.0100 | | | |

FIG. 9

| SECOND EMBODIMENT | S1 | S2 | S3 | S4 | S5 | S6 | S7 | S8 | S9 | S10 | S11 | S12 |
|---|---|---|---|---|---|---|---|---|---|---|---|---|
| K | 0 | 0 | 0 | 0 | 99.00000 | -21.00679 | -0.90877 | 0.00000 | 3.75402 | -0.81822 | -0.18423 | -4.391761 |
| A | 0.17102 | 0.30103 | -0.11252 | -0.55840 | -0.29273 | -0.37642 | -1.01910 | -0.24771 | 0.58963 | 0.61698 | -0.38090 | -0.159673 |
| B | -0.04967 | -0.08234 | -0.01228 | 0.19334 | 0.08153 | 0.82372 | 0.48476 | -1.32191 | -1.31380 | -1.51939 | 0.16507 | 0.075573 |
| C | 0.02887 | 0.00827 | -0.39743 | 0.00613 | 1.35747 | -4.91513 | -9.05213 | 4.17022 | 0.82441 | 2.99255 | -0.06141 | -0.033159 |
| D | 0.00337 | 0.19915 | 0.34759 | 0.84361 | -7.38749 | 22.63114 | 50.86407 | -7.35601 | 0.95247 | -3.87600 | 0.01650 | 0.008503 |
| E | -0.00003 | 0 | 0 | 0 | 30.06785 | -55.24359 | -134.2013 | 7.13413 | -1.06678 | 2.87106 | -0.00161 | -0.001069 |
| F | 0 | 0 | 0 | 0 | -43.93436 | 49.54155 | 128.8365 | -2.53944 | 0.20909 | -0.83833 | -0.00018 | 0.000052 |
| G | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 |

FIG. 10

| THIRD EMBODIMENT ||||||
|---|---|---|---|---|---|
| TTL = 3.690 |||| f = | 2.4820 |
| SURFACE NO. | | RADIUS OF CURVATURE | THICKNESS/ DISTANCE | REFRACTIVE INDEX | ABBE NUMBER | FOCAL LENGTH |
| S1 | FIRST LENS | infinity | 0.2907 | 1.614 | 25.6 | 93.241 |
| S2 | | −57.269 | 0.0500 | | | |
| S3 | SECOND LENS | 1.3364 | 0.3639 | 1.544 | 56.1 | 5.156 |
| S4 | | 2.3073 | 0.0711 | | | |
| S5 | THIRD LENS | 6.0786 | 0.3226 | 1.544 | 56.1 | 6.554 |
| S6 | | −8.4673 | 0.1131 | | | |
| S7 | FOURTH LENS | 7.6745 | 0.2300 | 1.651 | 21.5 | −11.984 |
| S8 | | 3.8230 | 0.2821 | | | |
| S9 | FIFTH LENS | −1.6321 | 0.5202 | 1.544 | 56.1 | 1.373 |
| S10 | | −0.5702 | 0.1695 | | | |
| S11 | SIXTH LENS | 2.6558 | 0.2400 | 1.534 | 55.7 | −1.449 |
| S12 | | 0.5807 | 0.2769 | | | |
| S13 | FILTER | infinity | 0.1100 | | | |
| S14 | | infinity | 0.6504 | | | |
| S15 | IMAGING PLANE | infinity | −0.0004 | | | |

FIG. 14

| THIRD EMBODIMENT | S1 | S2 | S3 | S4 | S5 | S6 | S7 | S8 | S9 | S10 | S11 | S12 |
|---|---|---|---|---|---|---|---|---|---|---|---|---|
| K | 0 | 0 | 0 | 0 | 99.00000 | -21.00679 | -0.90876 | 0.00000 | 2.74072 | -0.90125 | 0.37208 | -5.107627 |
| A | 0.14673 | 0.27575 | -0.08230 | -0.53355 | -0.35214 | -0.67848 | -0.96593 | -0.38405 | 0.07843 | 1.16928 | -0.38270 | -0.231661 |
| B | -0.00605 | -0.01497 | 0.04720 | -0.11098 | -0.27231 | 1.93496 | 0.54173 | -0.05669 | 0.40415 | -3.82692 | 0.11596 | 0.142681 |
| C | 0.03736 | 0.06361 | -0.94702 | 0.04690 | 5.03476 | -9.99863 | -1.53886 | 1.07362 | -3.88906 | 9.42157 | 0.04522 | -0.069410 |
| D | -0.01946 | 0.18778 | 0.54244 | 2.79477 | -26.56703 | 48.43975 | 13.67414 | -1.21758 | 11.09783 | -15.77760 | -0.03514 | 0.019167 |
| E | 0.01234 | 0 | 0 | 0 | 92.32955 | -126.5222 | -54.85624 | -2.61316 | -13.18186 | 14.97924 | 0.00772 | -0.002584 |
| F | 0 | 0 | 0 | 0 | -113.0955 | 134.2446 | 68.42607 | 3.69857 | 5.51775 | -5.56475 | -0.00059 | 0.000132 |
| G | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 |

FIG. 15

| FOURTH EMBODIMENT |||||||
| --- | --- | --- | --- | --- | --- | --- |
| TTL = 4.150 |||| f = | 2.4860 ||
| SURFACE NO. || RADIUS OF CURVATURE | THICKNESS/ DISTANCE | REFRACTIVE INDEX | ABBE NUMBER | FOCAL LENGTH |
| S1 | FIRST LENS | Infinity | 0.2998 | 1.614 | 25.6 | 24511.982 |
| S2 | | -15055.259 | 0.0500 | | | |
| S3 | SECOND LENS | 1.3474 | 0.4414 | 1.544 | 56.1 | 6.055 |
| S4 | | 2.0168 | 0.1149 | | | |
| S5 | THIRD LENS | 7.2882 | 0.3248 | 1.544 | 56.1 | 8.336 |
| S6 | | -11.8193 | 0.2207 | | | |
| S7 | FOURTH LENS | 3.9875 | 0.2348 | 1.651 | 21.5 | -9.026 |
| S8 | | 2.3203 | 0.1831 | | | |
| S9 | FIFTH LENS | -2.1461 | 0.7055 | 1.544 | 56.1 | 1.490 |
| S10 | | -0.6565 | 0.0500 | | | |
| S11 | SIXTH LENS | 1.8730 | 0.4326 | 1.534 | 55.7 | -2.099 |
| S12 | | 0.6451 | 0.3323 | | | |
| S13 | FILTER | infinity | 0.1100 | | | |
| S14 | | infinity | 0.6400 | | | |
| S15 | IMAGING PLANE | infinity | 0.0100 | | | |

FIG. 19

| FOURTH EMBODIMENT | S1 | S2 | S3 | S4 | S5 | S6 | S7 | S8 | S9 | S10 | S11 | S12 |
|---|---|---|---|---|---|---|---|---|---|---|---|---|
| K | 0 | 0 | 0 | 0 | 99.00000 | -21.00679 | -0.90877 | 0.00000 | 4.11793 | -0.81752 | -0.11118 | -4.907792 |
| A | 0.19706 | 0.29492 | -0.07135 | -0.48186 | -0.37032 | -0.43231 | -0.93192 | -0.44587 | 0.33556 | 0.72498 | -0.31442 | -0.132416 |
| B | -0.05839 | -0.00983 | 0.08304 | 0.20102 | 0.00497 | 0.76696 | 0.63994 | -0.27916 | -0.26095 | -1.77957 | 0.10292 | 0.050695 |
| C | 0.02760 | -0.06578 | -0.25922 | -0.25895 | 1.69568 | -2.07843 | -4.79998 | 0.92670 | -1.21778 | 3.45607 | -0.01287 | -0.018241 |
| D | 0.01167 | 0.17723 | 0.03815 | 0.56793 | -6.62698 | 6.38810 | 20.16791 | -0.36308 | 3.73051 | -4.40541 | -0.00103 | 0.003635 |
| E | -0.00668 | 0 | 0 | 0 | 15.15133 | -11.37828 | -40.0310 | -1.15466 | -3.99647 | 3.13442 | 0.00054 | -0.000298 |
| F | 0 | 0 | 0 | 0 | -13.29753 | 7.21724 | 28.7300 | 0.98132 | 1.61994 | -0.88280 | -0.00008 | 0.000005 |
| G | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 |

FIG. 20

OPTICAL IMAGING SYSTEM

CROSS-REFERENCE TO RELATED APPLICATIONS

This application is a continuation of U.S. patent application Ser. No. 15/085,090 filed on Mar. 30, 2016, now U.S. Pat. No. 10,976,521 issued on Apr. 13, 2021, which claims the benefit under 35 USC 119 (a) of Korean Patent Application No. 10-2015-0166744 filed on Nov. 26, 2015, in the Korean Intellectual Property Office, the entire disclosures of which are incorporated herein by reference for all purposes.

BACKGROUND

1. Field

The following description relates to an optical imaging system including lenses.

2. Description of Related Art

In certain electronic devices, a small camera is mounted in a portable terminal. For example, a camera may be mounted on each of a front surface and a rear surface of a mobile phone. A first camera mounted on the front surface of the mobile phone is mainly used to photograph an object at a short distance, while a second camera mounted on the rear surface of the mobile phone is mainly used to photograph an object at a long distance. For this reason, the first camera has been configured using an optical imaging system having a relatively lower level of resolution than that of the second camera, because having a higher resolution may be less important when capturing images of subjects at a short distance.

However, in accordance with an increase in utilization of the first camera mounted on the front surface of the mobile phone, it is desirable to develop a first camera having high levels of resolution and brightness as in the second camera, while still having a field of view appropriate for photographing an object at a short distance. To achieve this goal, it is also desirable to develop an optical imaging system mounted in the first camera that improves the resolution and brightness properties of the first camera while retaining an appropriate field of view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having a positive refractive power, a second lens having a positive refractive power, a third lens having a positive refractive power, a fourth lens having a negative refractive power, a fifth lens having a positive refractive power, wherein an object-side surface of the fifth lens is concave, and a sixth lens having a negative refractive power, wherein the sixth lens includes an inflection point formed on an image-side surface thereof, and wherein the first to sixth lenses are sequentially disposed from an object side of the optical imaging system, towards an imaging plane.

A paraxial region of an object-side surface of the first lens may be a planar region, and an image-side surface of the first lens may be convex.

An object-side surface of the second lens may be convex, and an image-side surface of the second lens may be concave.

An object-side surface of the third lens may be convex, and an image-side surface of the third lens may be convex.

An object-side surface of the fourth lens may be convex, and an image-side surface of the fourth lens may be concave.

An object-side surface of the fifth lens may be concave, and an image-side surface of the fifth lens may be convex.

An object-side surface of the sixth lens may be convex, and an image-side surface of the sixth lens may be concave.

The optical imaging system may satisfy $BL/f<0.5$, where BL is a distance from the image-side surface of the sixth lens to the imaging plane, and f is an overall focal length of the optical imaging system.

The optical imaging system may satisfy $R3/f<0.5$, where R3 is a radius of curvature of an object-side surface of the second lens, and f is an overall focal length of the optical imaging system.

The optical imaging system may satisfy $V1-V2<-25$, where V1 is an Abbe number of the first lens, and V2 is an Abbe number of the second lens.

The optical imaging system may satisfy $0.2<(R7-R8)/(R7+R8)<0.8$, where R7 is a radius of curvature of an object-side surface of the fourth lens, and R8 is a radius of curvature of an image-side surface of the fourth lens.

The optical imaging system may satisfy $0.4<(R9-R10)/(R9+R10)<0.6$, where R9 is a radius of curvature of the object-side surface of the fifth lens, and R10 is a radius of curvature of an image-side surface of the fifth lens.

The optical imaging system may satisfy $SL/TTL<0.85$, where SL is a distance from a stop to the imaging plane, and TTL is a distance from an object-side surface of the first lens to the imaging plane.

The optical imaging system may satisfy $D12/TTL<0.03$, where D12 is a distance from an image-side surface of the first lens to an object-side surface of the second lens, and TTL is a distance from an object-side surface of the first lens to the imaging plane.

The optical imaging system may satisfy $D56/TTL<0.85$, where D56 is a distance from an image-side surface of the fifth lens to an object-side surface of the sixth lens, and TTL is a distance from an object-side surface of the first lens to the imaging plane.

In another general aspect, an optical imaging system includes a first lens, wherein a paraxial region of an object-side surface of the first lens is a planar region and an image-side surface is convex, a second lens, a third lens, wherein an object-side surface and an image-side surface of the third lens are convex, a fourth lens, wherein an object-side surface of the fourth lens is convex, a fifth lens, and a sixth lens, wherein an object-side surface of the sixth lens is convex, wherein the first to sixth lenses are sequentially disposed from an object side of the optical imaging system, towards an imaging plane.

In another general aspect, an optical imaging system includes a first lens having a positive refractive power, a second lens including a convex object-side surface and a concave image-side surface, a third lens including a convex object-side surface and a convex image-side surface, a fourth lens including a convex object-side surface and a concave image-side surface, a fifth lens including a concave object-side surface and a convex image-side surface, and a sixth lens having a negative refractive power.

A paraxial region of an object-side surface of the first lens may be a planar region, and the first lens may include a convex image-side surface.

The sixth lens may include an inflection point formed on an image-side surface thereof.

The sixth lens may include a convex object-side surface and a concave image-side surface.

Other features and aspects will be apparent from the following detailed description, the drawings, and the claims.

BRIEF DESCRIPTION OF THE DRAWINGS

FIG. 4 is a table representing characteristics of lenses of the optical imaging system illustrated in the embodiment of FIG. 1.

FIG. 5 is a table representing aspherical characteristics of the optical imaging system illustrated in the embodiment of FIG. 1.

FIG. 9 is a table representing characteristics of lenses of the optical imaging system illustrated in the embodiment of FIG. 6.

FIG. 10 is a table representing aspherical characteristics of the optical imaging system illustrated in the embodiment of FIG. 6.

FIG. 14 is a table representing characteristics of lenses of the optical imaging system illustrated in the embodiment of FIG. 11.

FIG. 15 is a table representing aspherical characteristics of the optical imaging system illustrated in the embodiment of FIG. 11.

FIG. 19 is a table representing characteristics of lenses of the optical imaging system illustrated in the embodiment of FIG. 16.

FIG. 20 is a table representing aspherical characteristics of the optical imaging system illustrated in the embodiment of FIG. 16.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
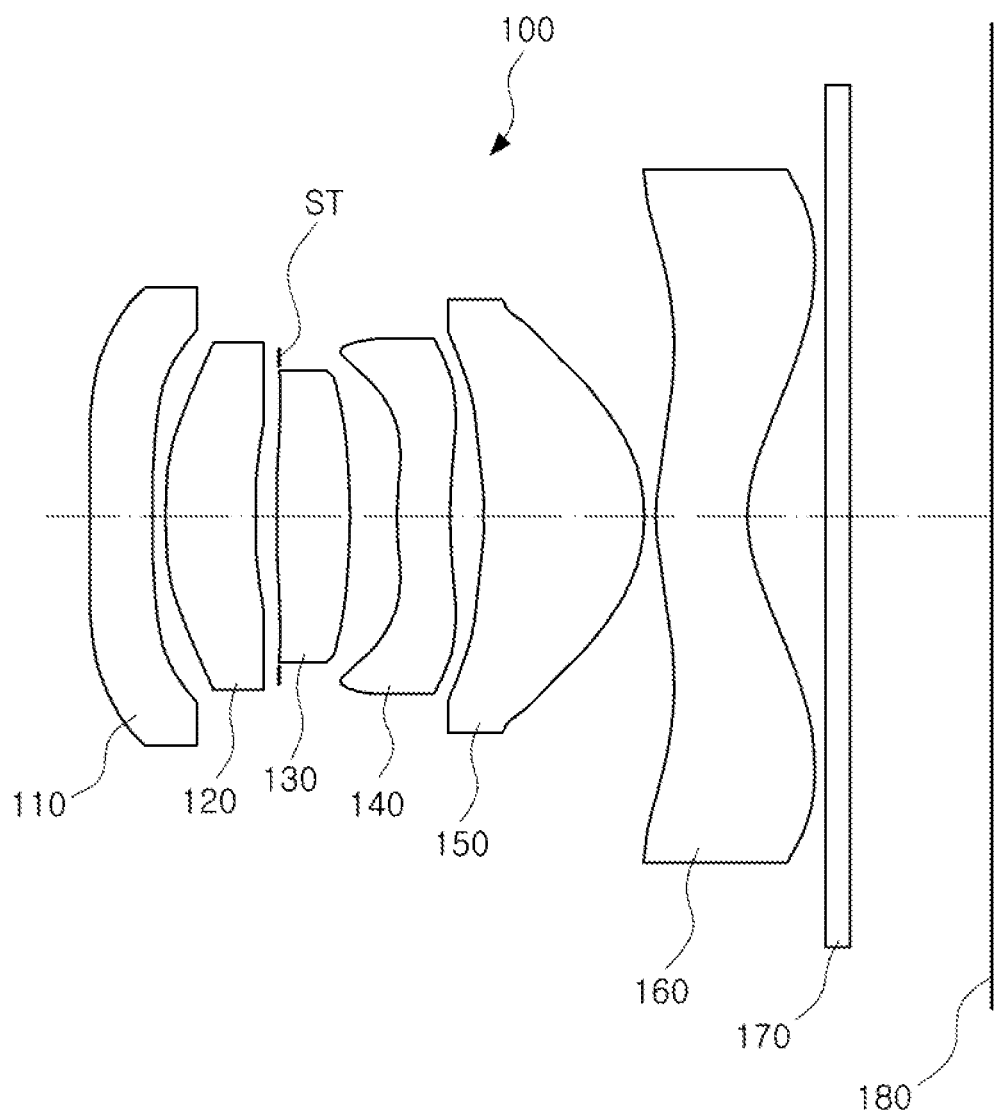
FIG. 1 is a view of an optical imaging system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it is to be understood that when an element, such as a layer, region or wafer (substrate), is referred to as being "on," "connected to," or "coupled to" another element, it may be directly "on," "connected to," or "coupled to" the other element or other elements intervening between the elements may be present. In contrast, when an element is referred to as being "directly on," "directly connected to," or "directly coupled to" another element, there are no elements or layers intervening between the elements. Like numerals refer to like elements throughout. Also, as used herein, the term "and/or" includes any and all combinations of one or more of the associated listed items.

It is intended to be apparent that although the terms first, second, third, etc. are used herein to describe various members, components, regions, layers and/or sections, these members, components, regions, layers and/or sections are not to be limited by these terms. These terms are only used to distinguish one member, component, region, layer or section from another region, layer or section. Thus, a first member, component, region, layer or section discussed below could also be termed a second member, component, region, layer or section or otherwise identified in a similar manner without departing from the embodiments.

Spatially relative terms, such as "above," "upper," "below," and "lower" and the like, are used herein for ease of description to describe one element's relationship to another element(s) as shown in the figures. It is to be understood that the spatially relative terms are intended to include different orientations of the device in use or operation in addition to the orientation depicted in the figures. For example, if the device in the figures is turned over, elements described as "above," or "upper" other elements would then be oriented "below," or "lower" the other elements or features, as appropriate. Thus, the term "above" encompasses both the above and below orientations, depending on a particular direction of the figures. The device is also possibly otherwise oriented, such as being rotated 90 degrees or at other arbitrary orientations and the spatially relative descriptors used herein are to be interpreted accordingly.

The terminology used herein is for describing particular embodiments only and is not intended to be limiting of the present embodiments. As used herein, the singular forms "a," "an," and "the" are intended to include the plural forms as well, unless the context clearly indicates otherwise. It is to be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments are described with reference to schematic views illustrating aspects of the embodiments. However, in the drawings, for example, due to manufacturing techniques and/or tolerances, modifications of the shape shown may be estimated. Thus, embodiments are not to be construed as being limited to the particular shapes of regions shown herein, for example, to include a change in shape results in manufacturing. The following embodiments may also be constituted by having features illustrated in one or a combination of the drawings.

The contents of the present embodiments described below may have a variety of configurations. The present descriptions describe only certain aspects of a possible configuration of the embodiments, but the embodiments are not to be limited thereto.

An aspect of the present embodiments provides an optical imaging system that has a high level of resolution.

In addition, in the present specification, a first lens refers to a lens closest to an object or a subject that is to be photographed, while a sixth lens refers to a lens closest to an imaging plane or an image sensor that measures light incident upon it to generate the data for the photograph.

In addition, as discussed subsequently, all of radii of curvature and thicknesses of lenses, a through-the lens (TTL) aspect, an Img HT, such as ½ of a diagonal length of the imaging plane, and focal lengths are represented by millimeters (mm). In an embodiment, a TTL aspect refers to a feature of cameras whereby light levels are measured through the lens that captures the picture, as opposed to a separate metering window. Further, thicknesses of the lenses, gaps between the lenses, and the TTL are distances with respect to optical axes of the lenses. Further, in a description for shapes of the lenses, the meaning referred to that one surface of a lens is convex is that an optical axis portion of a corresponding surface is convex, and the meaning referred to that one surface of a lens is concave is that an optical axis portion of a corresponding surface is concave. Therefore, although it is described that one surface of a lens is convex, an edge portion of the lens is possibly concave. Likewise, although it is described that one surface of a lens is concave, an edge portion of the lens is possibly convex.

In an embodiment, an optical imaging system includes six lenses sequentially disposed from an object side toward an imaging plane. Next, respective lenses are described in further detail.

In this embodiment, the first lens has a refractive power. For example, the first lens has a positive refractive power.

The first lens may include a planar region. For example, a paraxial region of an object-side surface of the first lens may be a planar region. For example, the paraxial region refers to the hypothetical cylindrical narrow space surrounding the optical axis within which rays of light are still considered paraxial, or parallel to the axis. The first lens formed as described above is potentially easily processed.

In an embodiment, the first lens has an aspherical surface. For example, both surfaces of the first lens are aspherical. The first lens may be formed of a material that has a high light transmissivity and an excellent workability. For example, the first lens is possibly formed of plastic. For example, a variety of plastics are appropriate materials for use in the first lens. However, a material of the first lens is not to be limited to plastic. For example, the first lens is instead possibly formed of glass. In other embodiments, other appropriate materials that conform to the above characteristics with respect to desirable features of lens materials are used instead of plastic or glass.

In an embodiment, the second lens has a refractive power. For example, the second lens has a positive refractive power.

In such an embodiment, at least one surface of the second lens is convex. For example, an object-side surface of the second lens is convex.

The second lens may have an aspherical surface. For example, an object-side surface of the second lens is aspherical. The second lens may also be formed of a material having high light transmissivity and excellent workability, such as discussed above with respect to the first lens. For example, the second lens is formed of the same material as the first lens, or another material such as an appropriate plastic or glass material, or another material with appropriate attributes.

In an embodiment, the third lens has a refractive power. For example, the third lens has a negative refractive power.

In such an embodiment, at least one surface of the third lens is convex. For example, both surfaces of the third lens are convex.

The third lens may have an aspherical surface. For example, an image-side surface of the third lens is aspherical. The third lens may also be formed of a material having high light transmissivity and excellent workability. For example, the third lens is formed of the same material as the other lenses, or another material such as an appropriate plastic or glass material, or another material with appropriate attributes.

In an embodiment, the fourth lens has a refractive power. For example, the fourth lens has a negative refractive power.

In such an embodiment, one surface of the fourth lens is convex. For example, an object-side surface of the fourth lens is convex. Also, in such an embodiment, the fourth lens has an inflection point. For example, one or more inflection points are formed on an object-side surface and the image-side surface of the fourth lens.

The fourth lens may have an aspherical surface. For example, both surfaces of the fourth lens are aspherical. The fourth lens may also be formed of a material having high light transmissivity and excellent workability. For example, the fourth lens is formed of the same material as the other lenses, or another material such as an appropriate plastic or glass material, or another material with appropriate attributes.

In an embodiment, the fifth lens has a refractive power. For example, the fifth lens has a positive refractive power.

In such an embodiment, one surface of the fifth lens is concave. For example, an object-side surface of the fifth lens is concave.

The fifth lens may have an aspherical surface. For example, both surfaces of the fifth lens are aspherical. The fifth lens may also be formed of a material having high light transmissivity and excellent workability. For example, the fifth lens is formed of the same material as the other lenses, or another material such as an appropriate plastic or glass material, or another material with appropriate attributes.

In an embodiment, the sixth lens has a refractive power. For example, the sixth lens has a negative refractive power.

In such an embodiment, one surface of the sixth lens may be convex. For example, an object-side surface of the sixth lens is convex. Also, in such an embodiment, the sixth lens has inflection points. For example, one or more inflection points are formed on both surfaces of the sixth lens.

The sixth lens may have an aspherical surface. For example, both surfaces of the sixth lens are aspherical. The sixth lens may also be formed of a material having high light transmissivity and excellent workability. For example, the sixth lens is formed of the same material as the other lenses, or another material such as an appropriate plastic or glass material, or another material with appropriate attributes.

In an embodiment, the first to sixth lenses are formed of materials having a refractive index different from that of air. For example, the first to sixth lenses, as discussed, may be formed of plastic or glass. However, plastic and glass are only examples and other materials that have an appropriate refractive index may be used in an embodiment. In an embodiment, at least one of the first to sixth lenses has an aspherical shape. As an example, all of the first to sixth lenses may have the aspherical shape. For example, an aspherical surface of each lens is represented by the following Equation 1:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{Equation 1}$$

For example, in Equation 1, c is an inverse of a radius of curvature of the lens, k is a conic constant, r is a distance from a certain point on an aspherical surface of the lens to an optical axis of the lens, A to J are aspherical constants, and Z or SAG is a distance between the certain point on the aspherical surface of the lens at the distance Y and a tangential plane that meets the apex of the aspherical surface of the lens.

In an embodiment, the optical imaging system includes a stop. The stop may be disposed between the second and third lenses. For example, a stop is a limiting diameter that determines the amount of light which reaches the imaging area, and may be and possibly takes the form of an adjustable diaphragm near the front of the lens.

In an embodiment, the optical imaging system includes a filter. Such a filter controls the wavelengths of light that are imaged by the optical imaging system. The filter filters a partial wavelength from light passing through the first to sixth lenses. For example, the filter filters an infrared wavelength of the incident light. In such an example, the filter is manufactured to have a reduced thickness. To this end, the filter is formed of plastic.

Also, in an embodiment, the optical imaging system includes an image sensor. The image sensor provides an imaging plane upon which light refracted by the lenses is imaged. For example, a surface of the image sensor forms the imaging plane. In this embodiment, the image sensor is configured to realize a high resolution. For example, a unit size of pixels comprising the image sensor may be 1.12 μm or less.

The optical imaging system may satisfy the following Conditional Expressions, with respect to the characteristics of the system:

| | |
|---|---|
| $0.015 < (TTL/f)/FOV < 0.025$ | Conditional Expression 1 |
| $BL/f < 0.5$ | Conditional Expression 2 |
| $R3/f < 0.5$ | Conditional Expression 3 |
| $V1-V2 < -25$ | Conditional Expression 4 |
| $0.2 < (R7-R8)/(R7+R8) < 0.8$ | Conditional Expression 5 |
| $0.4 < (R9-R10)/(R9+R10) < 0.6$ | Conditional Expression 6 |
| $SL/TTL < 0.85$ | Conditional Expression 7 |
| $D12/TTL < 0.03$ | Conditional Expression 8 |
| $D56/TTL < 0.85$ | Conditional Expression 9 |

In an embodiment, TTL denotes a distance from the object-side surface of the first lens to the imaging plane, BL denotes a distance from an image-side surface of the sixth lens to the imaging plane, f denotes an overall focal length of the optical imaging system, R3 denotes a radius of curvature of the object-side surface of the second lens, V1 denotes an Abbe number of the first lens, V2 denotes an Abbe number of the second lens, R7 denotes a radius of curvature of the object-side surface of the fourth lens, R8 denotes a radius of curvature of the image-side surface of the fourth lens, R9 denotes a radius of curvature of the object-side surface of the fifth lens, R10 denotes a radius of curvature of an image-side surface of the fifth lens, SL denotes a distance from the stop to the imaging plane, D12 denotes a distance from an image-side surface of the first lens to the object-side surface of the second lens, and D56 denotes a distance from the image-side surface of the fifth lens to the object-side surface of the sixth lens. For instance, an Abbe number is a measure of the dispersion of the material of a lens, with respect to variation of refractive index versus wavelength. The optical imaging system satisfying the above Conditional Expressions, according to an embodiment, is miniaturized, and realizes a relatively high resolution.

Next, optical imaging systems according to several embodiments are described.

First, an optical imaging system according to a first embodiment is described further with reference to FIG. 1.

The optical imaging system 100 according to the first embodiment includes a plurality of lenses, each having a refractive power. For example, the optical imaging system 100 includes a first lens 110, a second lens 120, a third lens 130, a fourth lens 140, a fifth lens 150, and a sixth lens 160.

In the embodiment of FIG. 1, the first lens 110 has a positive refractive power, where a paraxial region of an object-side surface of the first lens 110 is a plane and an image-side surface of the first lens 110 is convex. The second lens 120 has a positive refractive power, and an object-side surface of the second lens 120 is convex and an image-side surface of the second lens 120 is concave. The third lens 130 has a positive refractive power, and an object-side surface of the third lens 130 is convex and an image-side surface of the third lens 130 is convex. The fourth lens 140 has a negative refractive power, and an object-side surface of the fourth lens 140 is convex and an image-side surface of the fourth lens 140 is concave. In addition, an inflection point is formed on the fourth lens 140.

For example, the image-side surface of the fourth lens 140 is concave in a paraxial region of the fourth lens 140, and is convex in the vicinity of the paraxial region of the fourth lens 140. The fifth lens 150 has a positive refractive power, and an object-side surface of the fifth lens 150 is concave and an image-side surface of the fifth lens 150 is convex. The sixth lens 160 has a negative refractive power, and an object-side surface of the sixth lens 160 is convex and an image-side surface of the sixth lens 160 is concave. In addition, inflection points are formed on both surfaces of the sixth lens 160. For example, the object-side surface of the sixth lens 160 is convex in a paraxial region of the sixth lens 160, and is concave in the vicinity of the paraxial region of the sixth lens 160. Similarly, the image-side surface of the sixth lens 160 is concave in a paraxial region of the sixth lens 160, and is convex in the vicinity of the paraxial region of the sixth lens 160.

In the embodiment of FIG. 1, the optical imaging system 100 includes a stop ST, as explained further, above. For example, the stop ST is located between the second lens 120 and the third lens 130. The stop ST located as described above adjusts an amount of light incident to an imaging plane 180.

Also, in the embodiment of FIG. 1, the optical imaging system 100 includes a filter 170. For example, the filter 170 is located between the sixth lens 160 and the imaging plane 180. The filter 170 located as described above filters infrared rays incident onto the imaging plane 180. However, other frequencies of light are filtered in other embodiments, as appropriate.

The optical imaging system 100 includes an image sensor. The image sensor provides the imaging plane 180 upon which light refracted through the lenses is imaged. In addition, the image sensor converts an optical signal imaged on the imaging plane 180 into an electrical signal for use by a computer or another appropriate electronic device.

Figure 2:
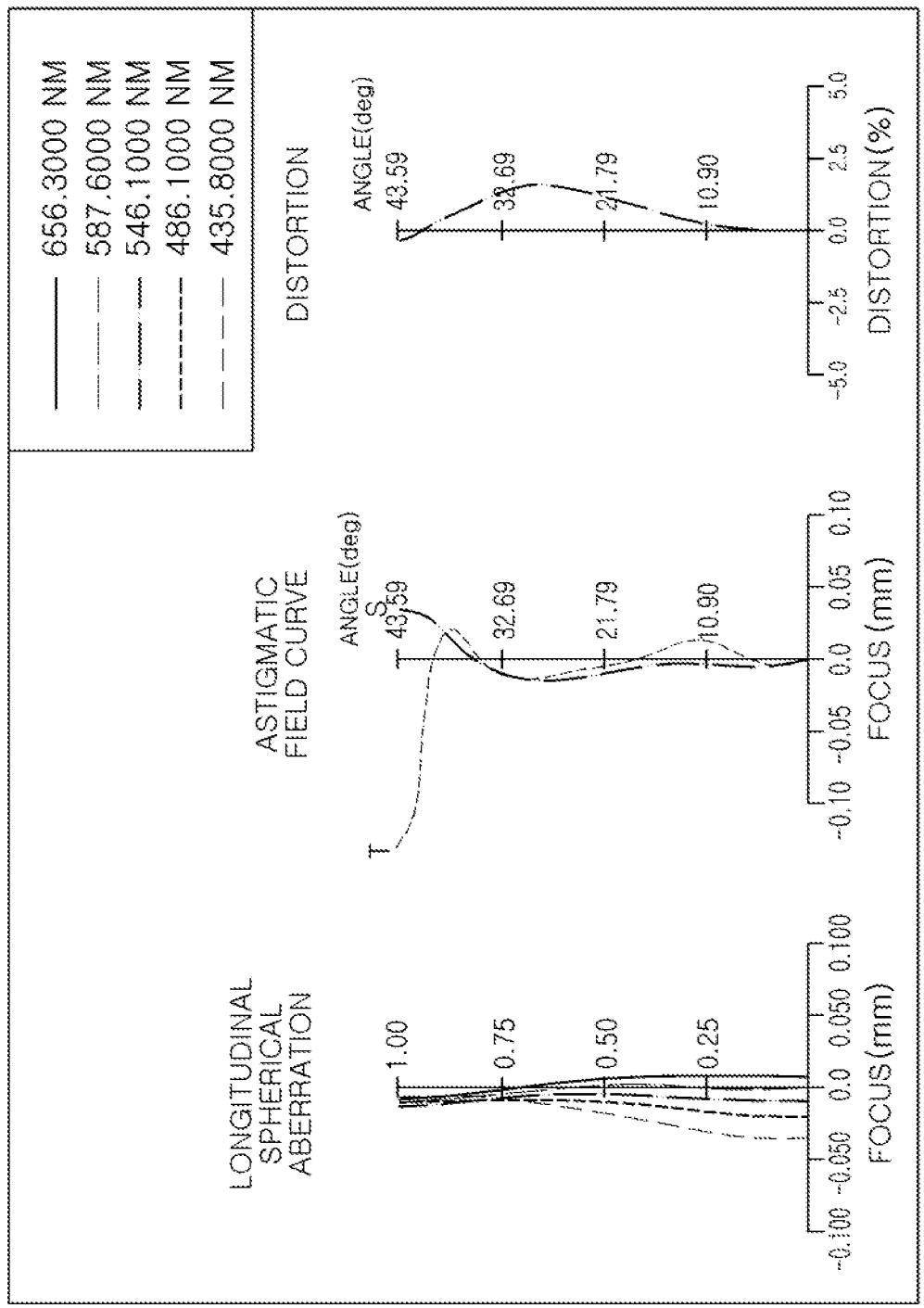
FIG. 2 includes graphs representing aberration curves of the optical imaging system illustrated in the embodiment of FIG. 1.
Figure 3:
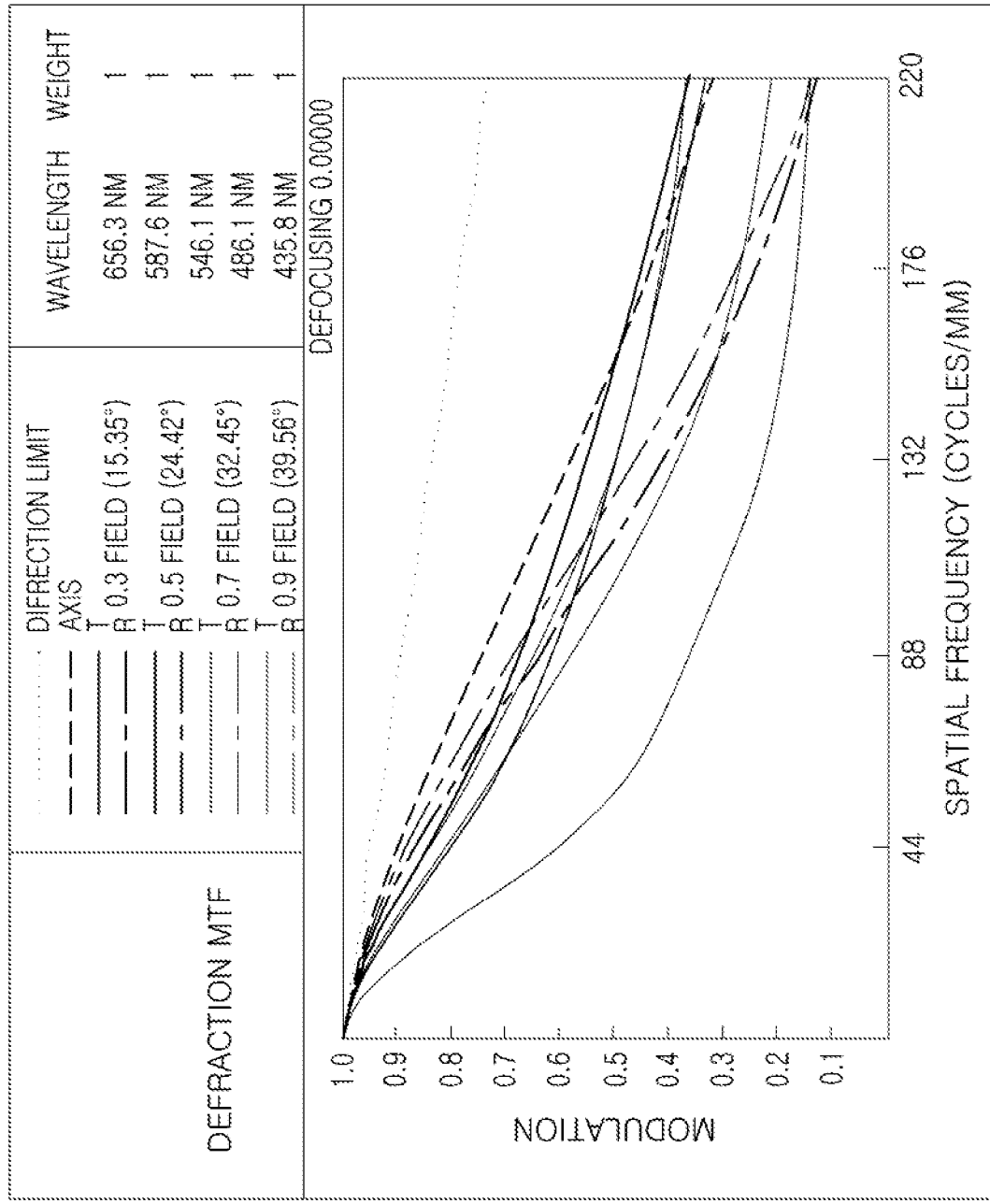
FIG. 3 includes graphs representing modulation transfer function (MTF) curves of the optical imaging system illustrated in the embodiment of FIG. 1.

The optical imaging system configured as described above provides representative aberration characteristics and modulation transfer function (MTF) characteristics as illustrated in the graphs presented in FIGS. 2 and 3. FIGS. 4 and 5 are tables representing characteristics of lenses and aspherical characteristics of the optical imaging system according to the embodiment of FIG. 1.

An optical imaging system according to a second embodiment is described with reference to FIG. 6.

Figure 6:
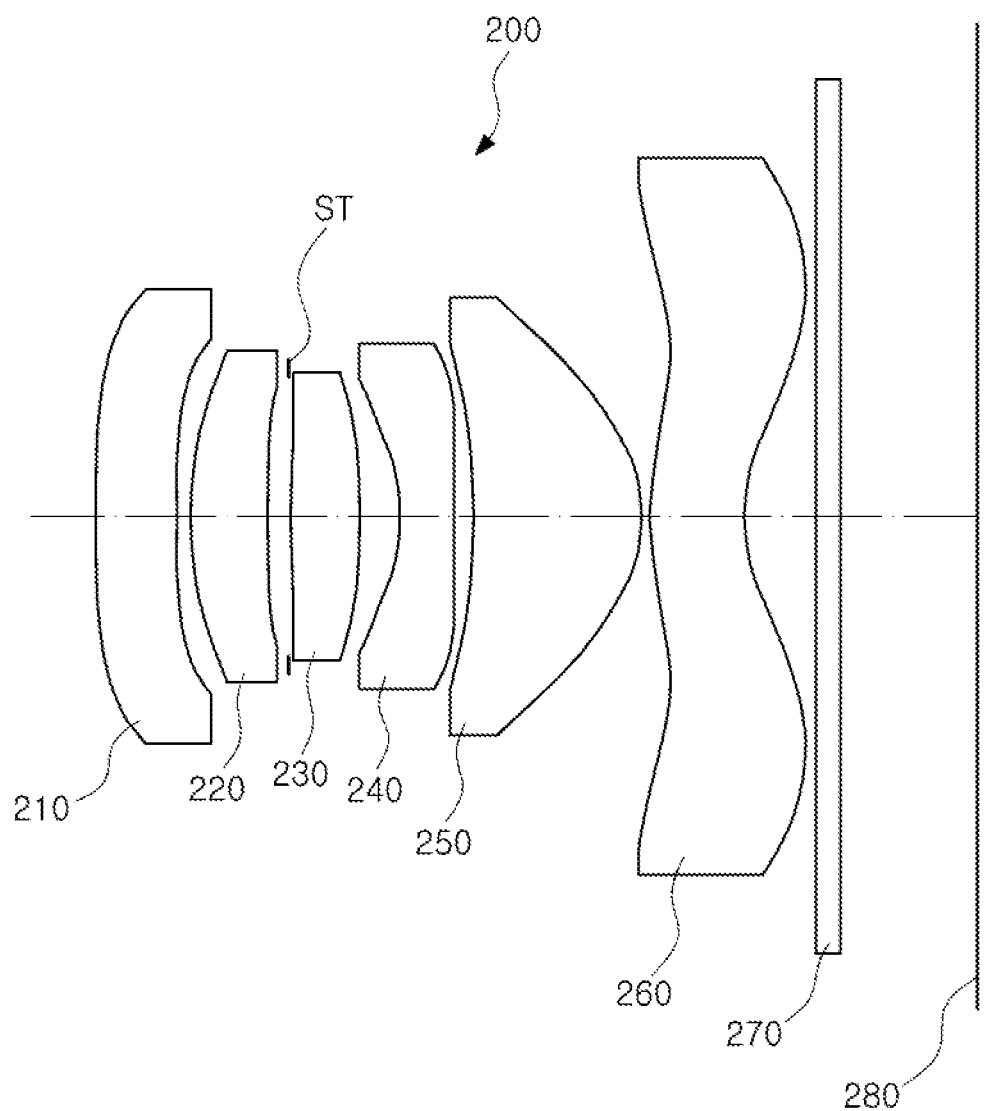
FIG. 6 is a view of an optical imaging system according to a second embodiment.

The optical imaging system 200 according to the second embodiment illustrated in FIG. 6 includes a plurality of lenses, each having a refractive power. For example, the optical imaging system 200 includes a first lens 210, a second lens 220, a third lens 230, a fourth lens 240, a fifth lens 250, and a sixth lens 260.

In the embodiment of FIG. 6, the first lens 210 has a positive refractive power, and a paraxial region of an object-side surface of the first lens 210 is a plane and an image-side surface of the first lens 210 is convex. The second lens 220 has a positive refractive power, and an object-side surface of the second lens 220 is convex and an image-side surface of the second lens 220 is concave. The third lens 230 has a positive refractive power, and an object-side surface of the third lens 230 is convex and an image-side surface of the third lens 230 is convex. The fourth lens 240 has a negative refractive power, and an object-side surface of the fourth lens 240 is convex and an image-side surface of the fourth lens 240 is concave. In addition, an inflection point is formed on the fourth lens 240. For example, the image-side surface of the fourth lens 240 is concave in a paraxial region of the fourth lens 240, and is convex in the vicinity of the paraxial region of the fourth lens 240. The fifth lens 250 has a positive refractive power, and an object-side surface of the fifth lens 250 is concave and an image-side surface of the fifth lens is convex. The sixth lens 260 has a negative refractive power, and an object-side surface of the sixth lens is convex and an image-side surface of the sixth lens 260 is concave. In addition, inflection points are formed on both surfaces of the sixth lens 260. For example, the object-side surface of the sixth lens is convex in a paraxial region of the sixth lens 260, and is concave in the vicinity of the paraxial region of the sixth lens 260. Similarly, the image-side surface of the sixth lens 260 is concave in a paraxial region of the sixth lens 260, and is convex in the vicinity of the paraxial region of the sixth lens 260.

In the embodiment of FIG. 6, the optical imaging system 200 includes a stop ST. For example, the stop ST is located between the second lens 220 and the third lens 230. The stop ST located as described above adjusts an amount of light incident onto an imaging plane 280.

In this embodiment, the optical imaging system 200 includes a filter 270. For example, the filter 270 is located between the sixth lens 260 and the imaging plane 280. The filter 270 located as described above filters infrared rays incident onto the imaging plane 280. However, other frequencies of light are filtered in other embodiments, as appropriate.

The optical imaging system 200 includes an image sensor. The image sensor may provide the imaging plane 280 on which light refracted through the lenses is imaged. In addition, the image sensor may convert an optical signal imaged on the imaging plane 280 into an electrical signal for use by a computer or another appropriate electronic device.

Figure 7:
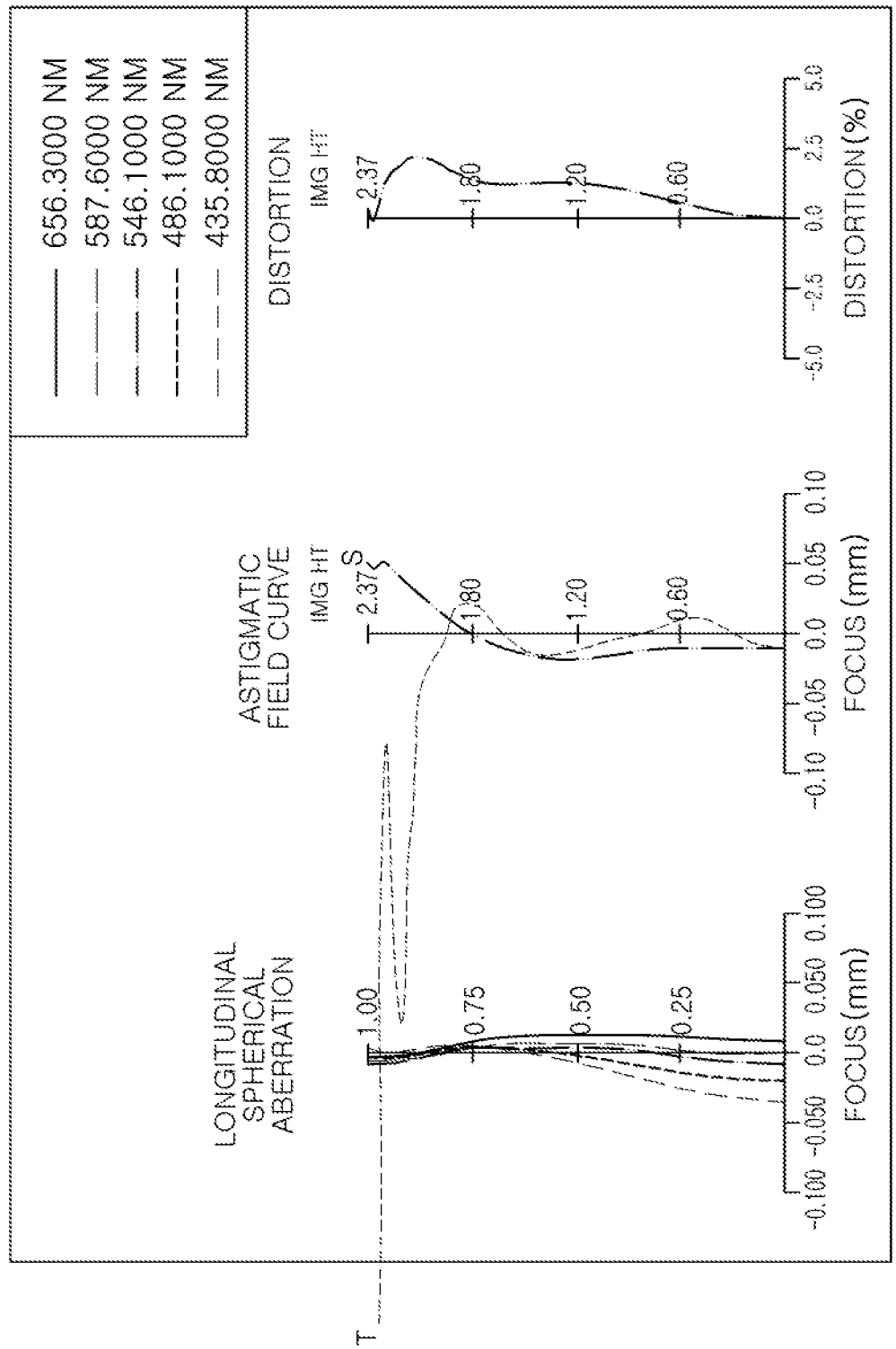
FIG. 7 includes graphs representing aberration curves of the optical imaging system illustrated in the embodiment of FIG. 6.
Figure 8:
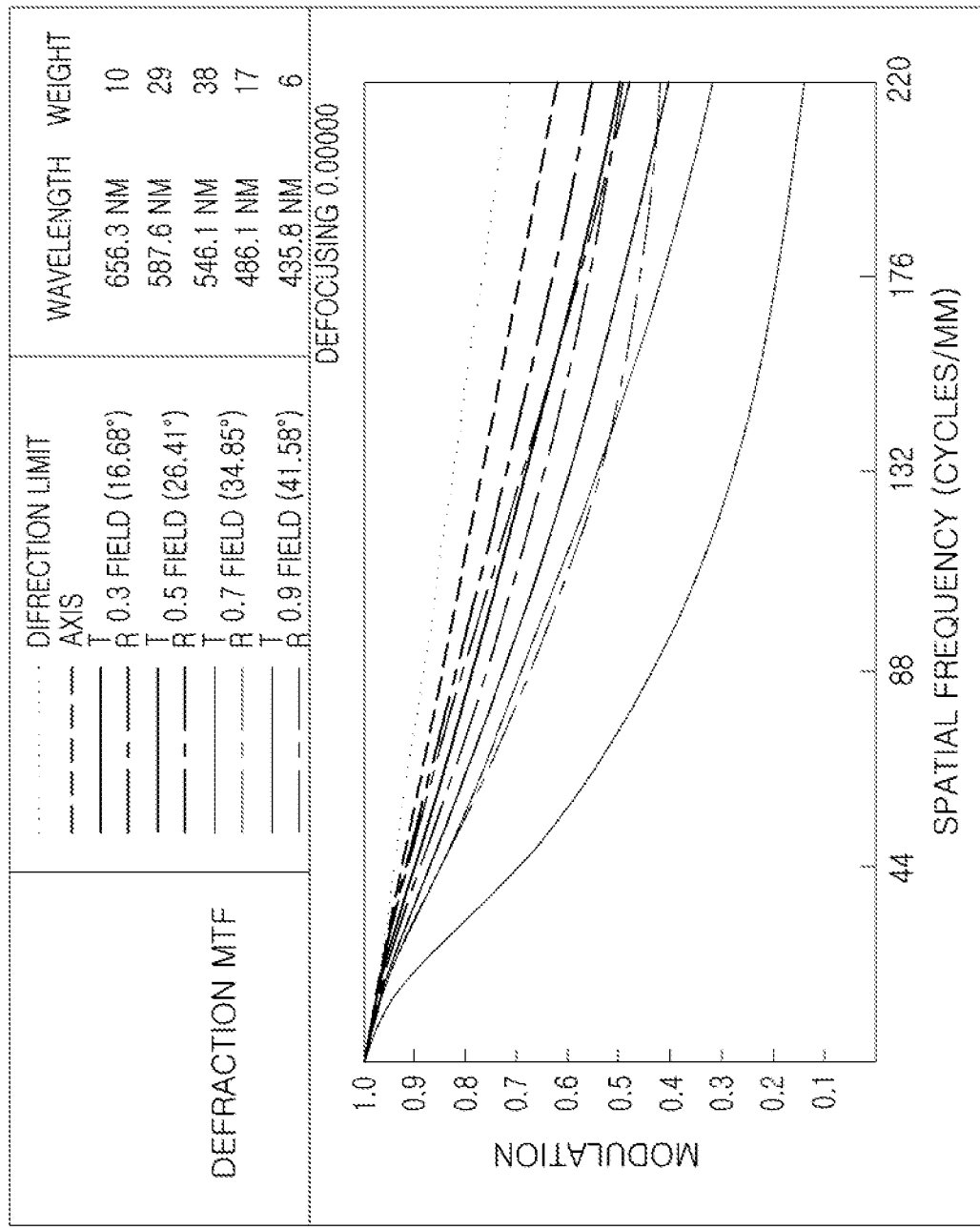
FIG. 8 includes graphs representing MTF curves of the optical imaging system illustrated in the embodiment of FIG. 6.

The optical imaging system configured as described above provides representative aberration characteristics and MTF characteristics as illustrated in FIGS. 7 and 8. FIGS. 9 and 10 are tables representing characteristics of lenses and aspherical characteristics of the optical imaging system according to the embodiment of FIG. 6.

An optical imaging system according to a third embodiment is described with reference to FIG. 11.

Figure 11:
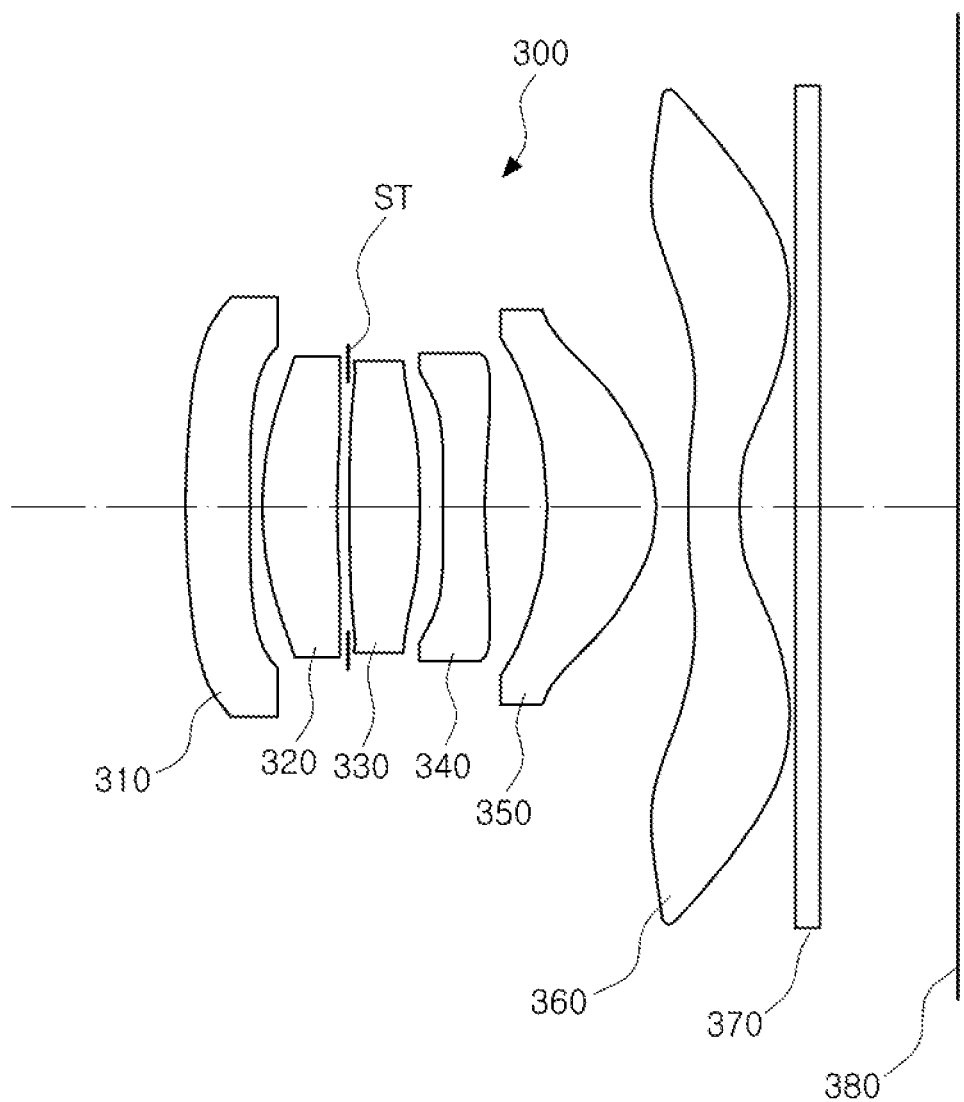
FIG. 11 is a view of an optical imaging system according to a third embodiment.

The optical imaging system 300 according to the third embodiment illustrated in FIG. 11 includes a plurality of lenses, each having a refractive power. For example, the optical imaging system 300 includes a first lens 310, a second lens 320, a third lens 330, a fourth lens 340, a fifth lens 350, and a sixth lens 360.

The first lens 310 has a positive refractive power, and a paraxial region of an object-side surface of the first lens 310 is a plane and an image-side surface of the first lens 310 is convex. The second lens 320 has a positive refractive power, and an object-side surface of the second lens 320 is convex and an image-side surface of the second lens is concave. The third lens 330 has a positive refractive power, and an object-side surface of the third lens 330 is convex and an image-side surface of the third lens 330 is convex. The fourth lens 340 has a negative refractive power, and an object-side surface of the fourth lens 340 is convex and an image-side surface of the fourth lens 340 is concave. In addition, an inflection point is formed on the fourth lens 340. For example, the image-side surface of the fourth lens 340 is concave in a paraxial region of the fourth lens 340, and is convex in the vicinity of the paraxial region of the fourth lens 340. The fifth lens 350 has a positive refractive power, and an object-side surface of the fifth lens 350 is concave and an image-side surface of the fifth lens 350 is convex. The sixth lens 360 has a negative refractive power, and an object-side surface of the sixth lens 360 is convex and an image-side surface of the sixth lens 360 is concave. In addition, inflection points are formed on both surfaces of the sixth lens 360. For example, the object-side surface of the sixth lens may be convex in a paraxial region of the sixth lens 360, and is concave in the vicinity of the paraxial region of the sixth lens 360. Similarly, the image-side surface of the sixth lens 360 is concave in a paraxial region of the sixth lens 360, and is convex in the vicinity of the paraxial region of the sixth lens 360.

In the embodiment of FIG. 11, the optical imaging system 300 includes a stop ST. For example, the stop ST is located between the second lens 320 and the third lens 330. The stop ST located as described above may adjust an amount of light incident onto an imaging plane 380.

In this embodiment, the optical imaging system 300 includes a filter 370. For example, the filter 370 is located between the sixth lens 360 and the imaging plane 380. The filter 370 disposed as described above filters infrared rays incident onto the imaging plane 380. However, other frequencies of light are filtered in other embodiments, as appropriate.

The optical imaging system 300 includes an image sensor. The image sensor provides the imaging plane 380 on which light refracted through the lenses is imaged. In addition, the image sensor converts an optical signal imaged on the imaging plane 380 into an electrical signal for use by a computer or another appropriate electronic device.

Figure 12:
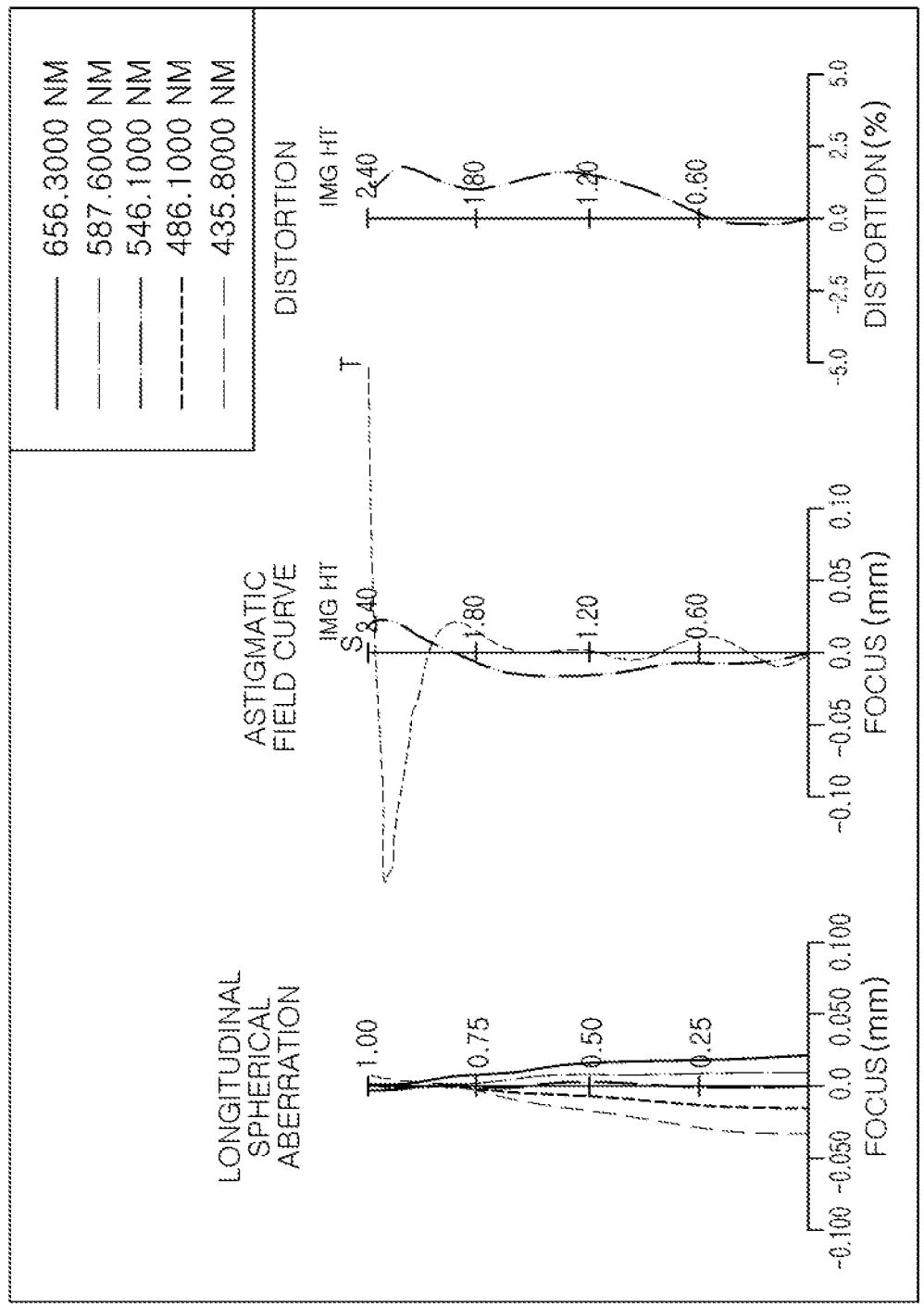
FIG. 12 includes graphs representing aberration curves of the optical imaging system illustrated in the embodiment of FIG. 11.
Figure 13:
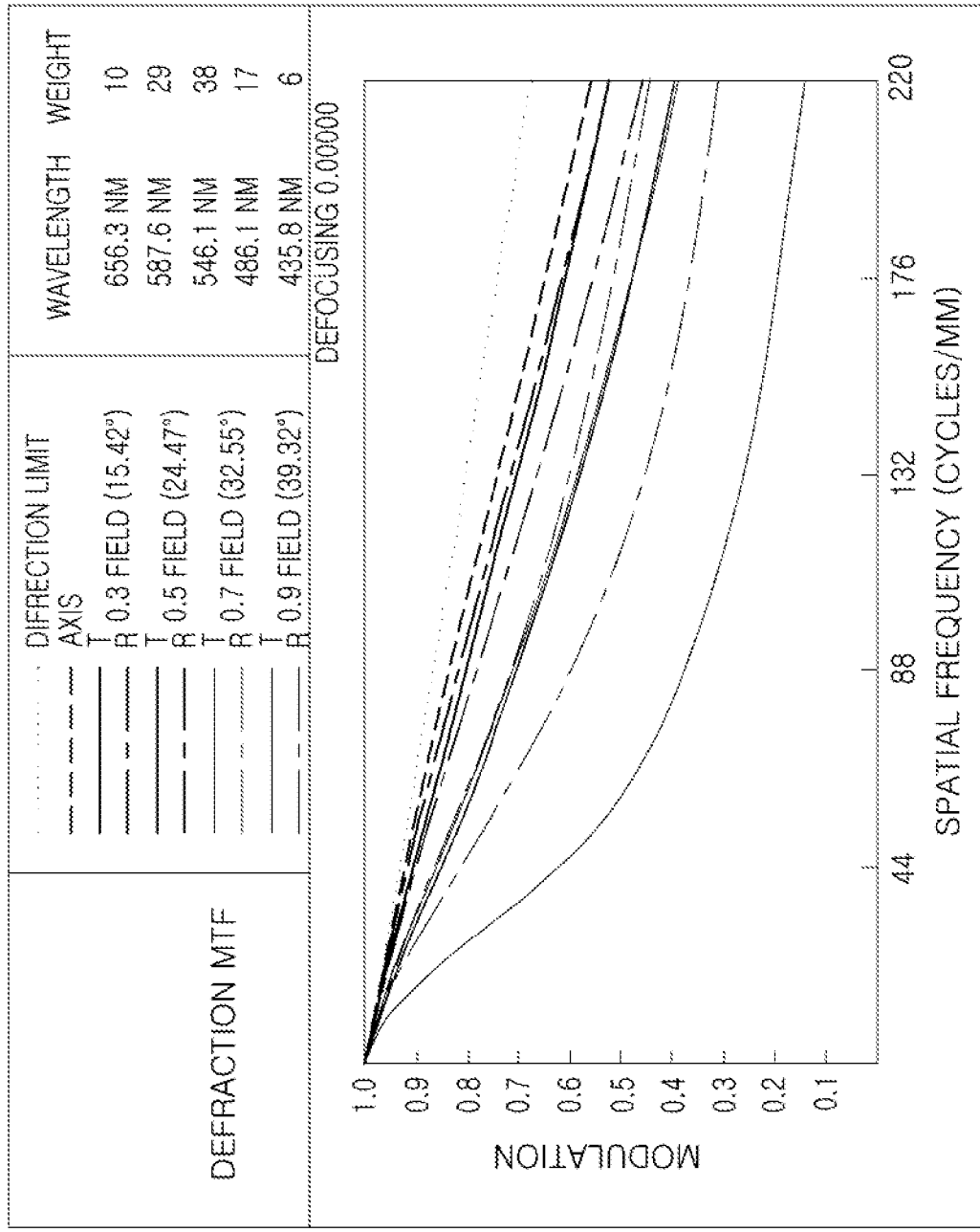
FIG. 13 includes graphs representing MTF curves of the optical imaging system illustrated in the embodiment of FIG. 11.

The optical imaging system configured as described above provides representative aberration characteristics and MTF characteristics as illustrated in FIGS. 12 and 13. FIGS. 14 and 15 are tables representing characteristics of lenses and aspherical characteristics of the optical imaging system according to the embodiment of FIG. 11.

An optical imaging system according to a fourth embodiment is described with reference to FIG. 16.

The optical imaging system 400 according to the fourth embodiment includes a plurality of lenses, each having a refractive power. For example, the optical imaging system 400 includes a first lens 410, a second lens 420, a third lens 430, a fourth lens 440, a fifth lens 450, and a sixth lens 460.

The first lens 410 has a positive refractive power, and a paraxial region of an object-side surface of the first lens 410 is a plane and an image-side surface of the first lens 410 is convex. The second lens 420 has a positive refractive power, and an object-side surface of the second lens 420 is convex and an image-side surface of the second lens 420 is concave. The third lens 430 has a positive refractive power, and an object-side surface of the third lens 430 is convex and an image-side surface of the third lens 430 is convex. The fourth lens 440 has a negative refractive power, and an object-side surface of the fourth lens 440 is convex and an image-side surface of the fourth lens 440 is concave. In addition, an inflection point is formed on the fourth lens 440. For example, the image-side surface of the fourth lens 440 is concave in a paraxial region of the fourth lens 440, and is convex in the vicinity of the paraxial region. The fifth lens 450 has a positive refractive power, and an object-side surface of the fifth lens 450 is concave and an image-side surface of the fifth lens 450 is convex. The sixth lens 460 has a negative refractive power, and an object-side surface of the sixth lens 460 is convex and an image-side surface of the sixth lens 460 is concave. In addition, inflection points are formed on both surfaces of the sixth lens 460. For example, the object-side surface of the sixth lens 460 is convex in a paraxial region of the sixth lens 460, and is concave in the vicinity of the paraxial region of the sixth lens 460. Similarly, the image-side surface of the sixth lens is concave in a paraxial region of the sixth lens 460, and is convex in the vicinity of the paraxial region of the sixth lens 460.

Figure 16:
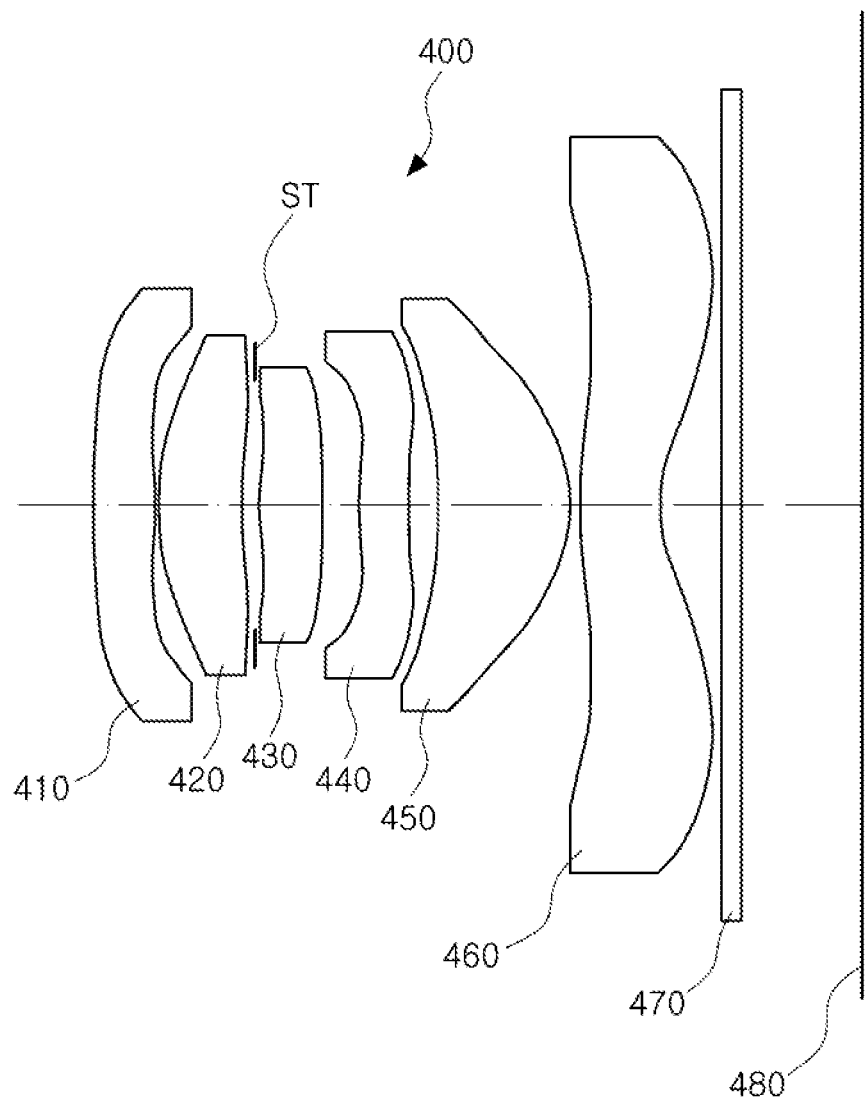
FIG. 16 is a view of an optical imaging system according to a fourth embodiment.

In the embodiment of FIG. 16, the optical imaging system 400 includes a stop ST. For example, the stop ST is located between the second lens 420 and the third lens 430. The stop ST disposed as described above adjusts an amount of light incident onto an imaging plane 480.

In this embodiment, the optical imaging system 400 includes a filter 470. For example, the filter 470 is disposed between the sixth lens 460 and the imaging plane 480. The filter 470 disposed as described above filters infrared rays incident onto the imaging plane 480. However, other frequencies of light are filtered in other embodiments, as appropriate.

The optical imaging system 400 includes an image sensor. The image sensor provides the imaging plane 480 on which light refracted through the lenses is imaged. In addition, the image sensor may convert an optical signal imaged on the imaging plane 480 into an electrical signal for use by a computer or another appropriate electronic device.

Figure 17:
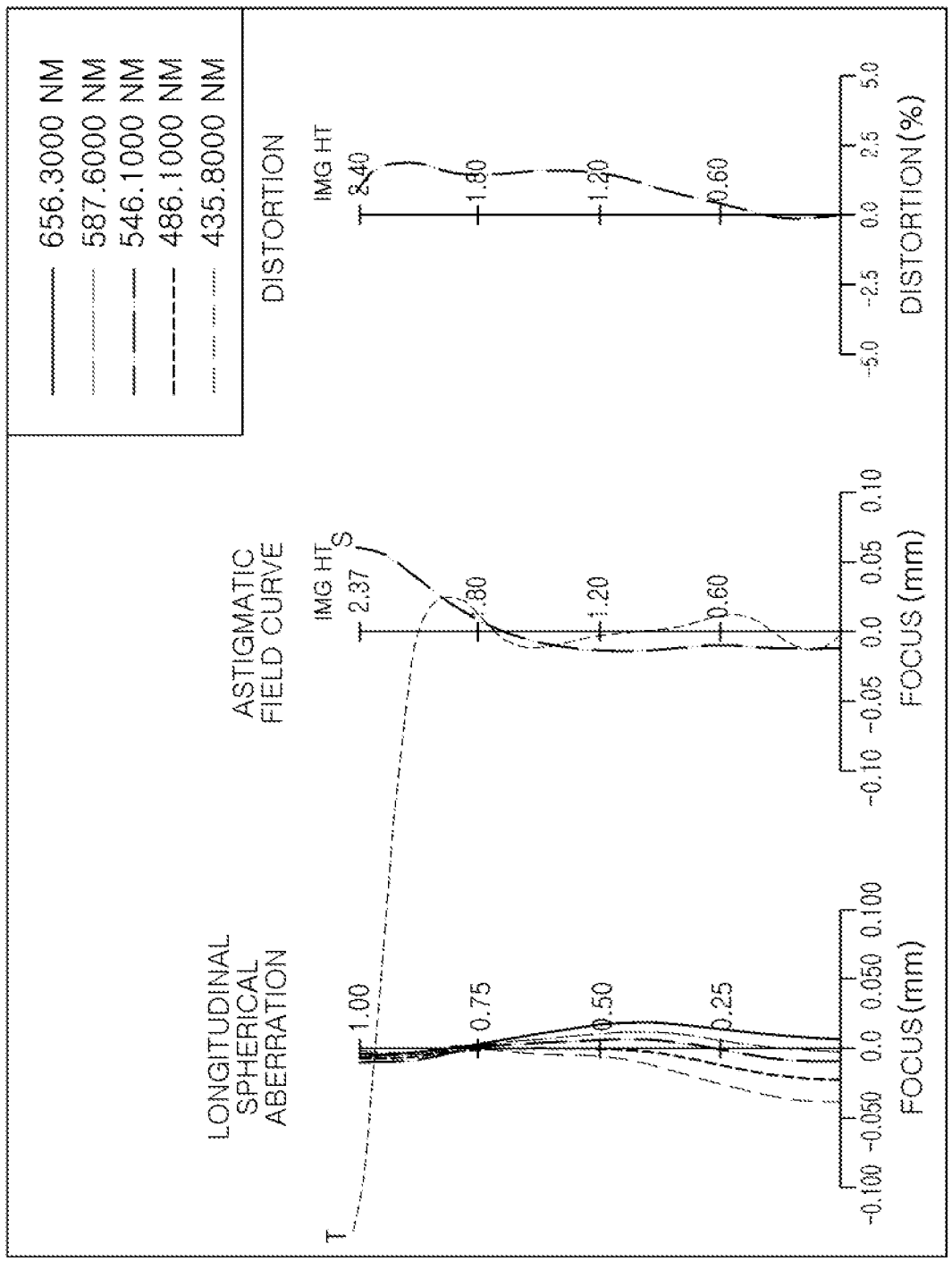
FIG. 17 includes graphs representing aberration curves of the optical imaging system illustrated in the embodiment of FIG. 16.
Figure 18:
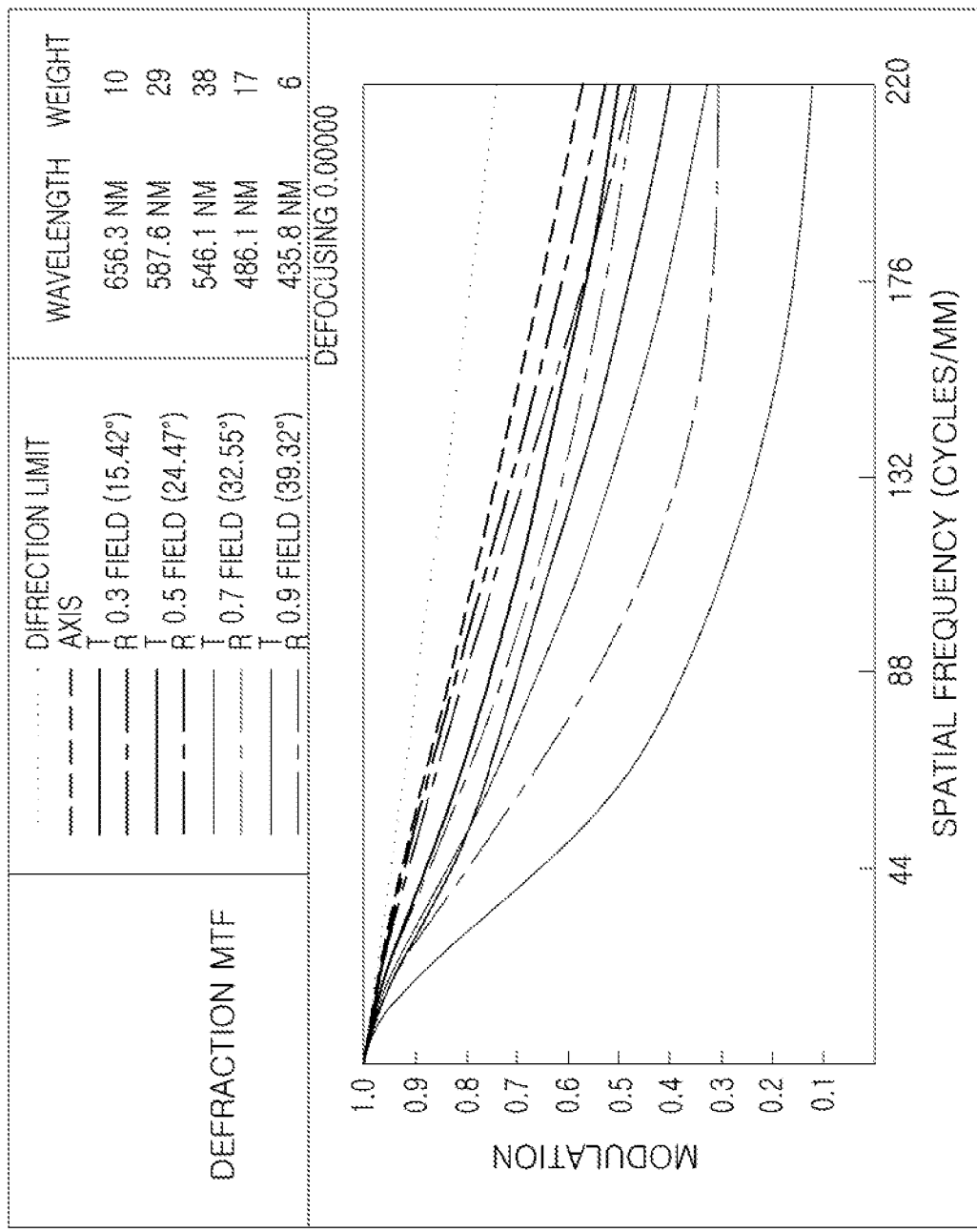
FIG. 18 includes graphs representing MTF curves of the optical imaging system illustrated in the embodiment of FIG. 16.

The optical imaging system configured as described above provides aberration characteristics and MTF characteristics as illustrated in FIGS. 17 and 18. FIGS. 19 and 20 are tables representing characteristics of lenses and aspherical characteristics of the optical imaging system according to the embodiment of FIG. 16.

Table 1 represents values of Conditional Expressions of the optical imaging systems according to the first to fourth embodiments presented as examples. As seen in Table 1, the optical imaging systems according to the first to fourth exemplary embodiments each satisfy all numerical ranges according to Conditional Expressions described above, in the present disclosure.

TABLE 1

| Conditional Expression | First Embodiment | Second Embodiment | Third Embodiment | Fourth Embodiment |
|---|---|---|---|---|
| (TTL/f)/FOV | 0.0200 | 0.0200 | 0.0180 | 0.0200 |
| BL/f | 0.4537 | 0.4847 | 0.4198 | 0.4413 |
| R3/f | 0.5577 | 0.6367 | 0.5834 | 0.5444 |
| V1 − V2 | −30.512 | −30.512 | −30.512 | −30.512 |
| (R7 − R8)/(R7 + R8) | 0.4760 | 0.7288 | 0.3350 | 0.2643 |
| (R9 − R10)/(R9 + R10) | 0.5440 | 0.5569 | 0.4822 | 0.5315 |
| SL/TTL | 0.7914 | 0.7789 | 0.7903 | 0.7817 |
| D1/TTL | 0.0121 | 0.0139 | 0.0135 | 0.0121 |
| D11/TTL | 0.0121 | 0.0121 | 0.0458 | 0.121 |

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens comprising a positive refractive power;
a second lens comprising a positive refractive power;
a third lens comprising a positive refractive power;
a fourth lens comprising a negative refractive power;
a fifth lens comprising a positive refractive power, and having a concave object-side surface in a paraxial region thereof; and
a sixth lens comprising a negative refractive power, wherein the sixth lens comprises an inflection point formed on an image-side surface thereof,
wherein the first to sixth lenses are sequentially disposed from an object side of the optical imaging system, towards an imaging plane,
wherein a radius of curvature of an object-side surface of the second lens is greater than a radius of curvature of an image-side surface of the first lens, and
wherein $0.2<(R7-R8)/(R7+R8)<0.8$, where R7 is a radius of curvature of an object-side surface of the fourth lens, and R8 is a radius of curvature of an image-side surface of the fourth lens.

2. The optical imaging system of claim 1, wherein a paraxial region of an object-side surface of the first lens is a planar region, and the image-side surface of the first lens is convex.

3. The optical imaging system of claim 1, wherein the object-side surface of the second lens is convex, and an image-side surface of the second lens is concave.

4. The optical imaging system of claim 1, wherein an object-side surface of the third lens is convex, and an image-side surface of the third lens is convex.

5. The optical imaging system of claim 1, wherein an object-side surface of the fourth lens is convex, and an image-side surface of the fourth lens is concave.

6. The optical imaging system of claim 1, wherein an object-side surface of the fifth lens is concave, and an image-side surface of the fifth lens is convex.

7. The optical imaging system of claim 1, wherein an object-side surface of the sixth lens is convex, and an image-side surface of the sixth lens is concave.

8. The optical imaging system of claim 1, wherein $BL/f<0.5$, where BL is a distance from the image-side surface of the sixth lens to the imaging plane, and f is an overall focal length of the optical imaging system.

9. The optical imaging system of claim 1, wherein $R3/f<0.5$, where R3 is a radius of curvature of an object-side surface of the second lens, and f is an overall focal length of the optical imaging system.

10. The optical imaging system of claim 1, wherein $V1-V2<-25$, where V1 is an Abbe number of the first lens, and V2 is an Abbe number of the second lens.

11. The optical imaging system of claim 1, wherein $0.4<(R9-R10)/(R9+R10)<0.6$, where R9 is a radius of curvature of the object-side surface of the fifth lens, and R10 is a radius of curvature of an image-side surface of the fifth lens.

12. The optical imaging system of claim 1, wherein $SL/TTL<0.85$, where SL is a distance from a stop to the imaging plane, and TTL is a distance from an object-side surface of the first lens to the imaging plane.

13. The optical imaging system of claim 1, wherein $D12/TTL<0.03$, where D12 is a distance from an image-side surface of the first lens to an object-side surface of the second lens, and TTL is a distance from an object-side surface of the first lens to the imaging plane.

14. The optical imaging system of claim 1, wherein $D56/TTL<0.85$, where D56 is a distance from an image-side surface of the fifth lens to an object-side surface of the sixth lens, and TTL is a distance from an object-side surface of the first lens to the imaging plane.

15. An optical imaging system, comprising:
a first lens, wherein an image-side surface of the first lens is convex in a paraxial region;
a second lens;
a third lens, wherein an object-side surface and an image-side surface of the third lens are convex in a paraxial region;
a fourth lens, wherein an object-side surface of the fourth lens is convex and an image-side surface of the fourth lens is concave in a paraxial region;
a fifth lens; and
a sixth lens, wherein an object-side surface of the sixth lens is convex in a paraxial region,
wherein the first to sixth lenses are sequentially disposed from an object side of the optical imaging system, towards an imaging plane,
wherein the optical imaging system comprises a total number of six lenses with refractive power, and
wherein $0.2<(R7-R8)/(R7+R8)<0.8$, where R7 is a radius of curvature of an object-side surface of the fourth lens, and R8 is a radius of curvature of an image-side surface of the fourth lens.

* * * * *